(12) United States Patent
Yamaguchi et al.

(10) Patent No.: US 12,269,335 B2
(45) Date of Patent: Apr. 8, 2025

(54) CONTROL DEVICE AND CONTROL METHOD

(71) Applicant: HONDA MOTOR CO., LTD., Tokyo (JP)

(72) Inventors: Yuki Yamaguchi, Tokyo (JP); Go Ito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/586,603

(22) Filed: Feb. 26, 2024

(65) Prior Publication Data

US 2024/0326579 A1    Oct. 3, 2024

(30) Foreign Application Priority Data

Mar. 30, 2023  (CN) .......................... 202310333224.3

(51) Int. Cl.
| | |
|---|---|
| *B60K 13/04* | (2006.01) |
| *B60K 1/00* | (2006.01) |
| *B60K 1/04* | (2019.01) |
| *B60K 6/40* | (2007.10) |
| *F01N 3/02* | (2006.01) |

(52) U.S. Cl.
CPC .............. *B60K 13/04* (2013.01); *B60K 6/40* (2013.01); *B60K 2001/003* (2013.01); *B60K 2001/005* (2013.01); *B60K 2001/0438* (2013.01); *F01N 3/0205* (2013.01); *F01N 2240/02* (2013.01); *F01N 2260/02* (2013.01); *F01N 2590/11* (2013.01); *F01N 2900/104* (2013.01)

(58) Field of Classification Search
CPC combination set(s) only.
See application file for complete search history.

(56) References Cited

U.S. PATENT DOCUMENTS

| | | | |
|---|---|---|---|
| 10,450,723 B2 * | 10/2019 | Osaka .................... | E02F 9/2075 |
| 11,619,185 B1 * | 4/2023 | Perez ...................... | B60L 50/10 |
| | | | 701/22 |
| 2012/0244403 A1 * | 9/2012 | Maskew ................. | B60L 50/16 |
| | | | 429/99 |
| 2015/0101789 A1 * | 4/2015 | Enomoto ............... | B60H 1/039 |
| | | | 236/35 |

(Continued)

FOREIGN PATENT DOCUMENTS

JP    2020-037313 A    3/2020

*Primary Examiner* — Binh Q Tran
(74) *Attorney, Agent, or Firm* — Paratus Law Group, PLLC

(57) ABSTRACT

A vehicle is partitioned into a vehicle interior and a front room in front of a vehicle interior by a dash panel extending upward from a floor panel, an internal combustion engine is disposed in the front room, an exhaust pipe extends in a front-rear direction below the floor panel, a heat shielding member is disposed above the exhaust pipe so as to cross the exhaust pipe when viewed from an upper-lower direction, a plurality of heat exchangers fixed to a bracket are fixed to a lower side of the floor panel such that they are located behind the front room, above the heat shielding member, and at least partially overlap the heat shielding member when viewed from the upper-lower direction, and the heat shielding member is divided into a first heat shielding plate and a second heat shielding plate in the front-rear direction.

4 Claims, 7 Drawing Sheets

(56) References Cited

U.S. PATENT DOCUMENTS

| | | | |
|---|---|---|---|
| 2016/0222631 A1* | 8/2016 | Kohno | H01M 10/647 |
| 2019/0301338 A1* | 10/2019 | Blas Martinez | F02B 39/10 |
| 2020/0070640 A1 | 3/2020 | Murai | |
| 2020/0247215 A1* | 8/2020 | Kozasa | F28F 1/128 |
| 2021/0129652 A1 | 5/2021 | Murai | |
| 2022/0037718 A1* | 2/2022 | Kaneshima | H01M 50/291 |

* cited by examiner

CONTROL DEVICE AND CONTROL METHOD

CROSS-REFERENCE RELATED APPLICATIONS

This application is based on and claims priority under 35 USC 119 from Chinese Patent Application No. 202310333224.3 filed on Mar. 30, 2023, the contents of which are incorporated herein by reference.

TECHNICAL FIELD

The present disclosure relates to a vehicle. In particular, the present disclosure relates to a vehicle equipped with heat exchangers.

BACKGROUND

In recent years, research and development have been performed on plug-in hybrid vehicles that contribute to improvement in energy efficiency in order to ensure access to affordable, reliable, sustainable and modern energy for more people.

An internal combustion engine and a driving battery unit are mounted on a plug-in hybrid vehicle, and the plug-in hybrid vehicle can travel by power of a driving motor driven by electric power stored in the driving battery unit.

In the related art, a heat exchanger is mounted on a vehicle. For example, Japanese Patent Application Laid-Open Publication No. 2020-037313 (hereinafter, referred to as Patent Literature 1) discloses a vehicle in which a water heating heater as one of heat exchangers is mounted in a front room (power unit room) formed in front of a vehicle interior.

However, when the technical matters described in Patent Literature 1 are applied to the plug-in hybrid vehicle, both an internal combustion engine and a drive motor may be accommodated in the front room. In this case, a space for disposing the heat exchanger is limited in the front room. Therefore, in the vehicle of Patent Literature 1, it is difficult to reduce the size of the front room.

The heat exchanger may be disposed outside the front room, for example, below a floor panel, as one option for reducing the size of the front room. When the heat exchanger is disposed below the floor panel, it is preferable to prevent the heat exchanger from receiving heat released from exhaust gas of the internal combustion engine flowing through an exhaust pipe, and to avoid complicating work during maintenance of the heat exchanger.

The present disclosure provides a vehicle in which the size of a front room can be reduced, and heat exchangers can be prevented from receiving heat released from exhaust gas of an internal combustion engine flowing through an exhaust pipe while preventing work during maintenance of the heat exchangers from becoming complicated. Further, this contributes to energy efficiency.

SUMMARY

An aspect of the present disclosure relates to a vehicle travelable by electric power stored in a driving battery unit, the vehicle including:
an internal combustion engine;
the driving battery unit;
a floor panel constituting a floor surface of a vehicle interior;
a plurality of heat exchangers fixed to a bracket; and
an exhaust pipe through which exhaust gas of the internal combustion engine flows, in which
the vehicle is partitioned into the vehicle interior and a front room in front of the vehicle interior by a dash panel extending upward from the floor panel,
the internal combustion engine is disposed in the front room,
the exhaust pipe extends in a front-rear direction below the floor panel,
a heat shielding member is disposed above the exhaust pipe so as to cross the exhaust pipe when viewed from an upper-lower direction,
the plurality of heat exchangers fixed to the bracket are fixed to a lower side of the floor panel such that the plurality of heat exchangers are located behind the front room, above the heat shielding member, and at least partially overlap the heat shielding member when viewed from the upper-lower direction, and
the heat shielding member is divided into a first heat shielding plate and a second heat shielding plate in the front-rear direction.

BRIEF DESCRIPTION OF DRAWINGS

Exemplary embodiments of the present invention will be described in detail based on the following figures, wherein.

DESCRIPTION OF EMBODIMENTS

Figure 1:
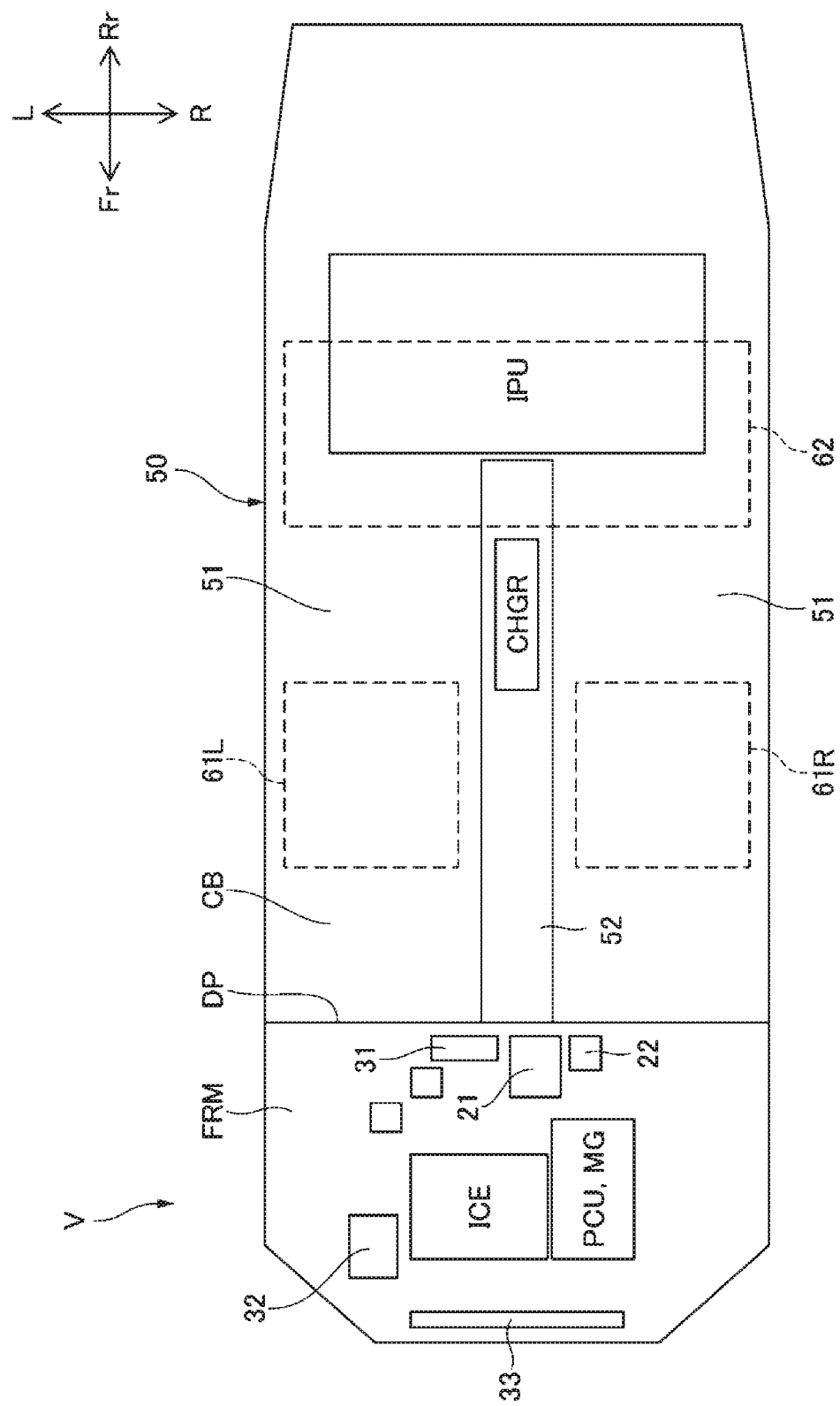
FIG. 1 is a schematic diagram of a main part of a vehicle according to an embodiment of the present disclosure when viewed from below.

Hereinafter, an embodiment of a vehicle of the present disclosure will be described with reference to the accompanying drawings. The drawings are viewed from directions of reference numerals.

Further, in order to simplify and clarify description in the present specification and the like, a front-rear direction, a left-right direction, and an upper-lower direction are described according to a direction viewed from a driver of a vehicle. In the drawings, a front side of the vehicle is shown as Fr, a rear side is shown as Rr, a left side is shown as L, a right side is shown as R, an upper side is shown as U, and a lower side is shown as D.

Overall Outline of Vehicle

As shown in FIG. 1, a vehicle V of the present embodiment includes a floor panel 50 constituting a floor surface of a vehicle interior CB. The vehicle V is partitioned into a vehicle interior CB and a front room FRM in front of the vehicle interior CB by a dash panel DP extending upward from a front end portion of the floor panel 50. The front room FRM in front of the vehicle interior CB accommodates an internal combustion engine ICE, a heater core 21 that heats air in the vehicle interior CB by exhaust heat from the internal combustion engine ICE, and an evaporator 31 that cools the air in the vehicle interior CB. In the present embodiment, a condenser 33 connected to the evaporator 31 is also accommodated in the front room FRM. A driving battery unit IPU is provided in a rear portion of the vehicle V. The driving battery unit IPU is disposed outside the vehicle interior CB.

The vehicle V drives a rotary electric machine MG capable of driving drive wheels of the vehicle V by electric power stored in the driving battery unit IPU. In the present embodiment, the rotary electric machine MG is accommodated in the front room FRM in front of the vehicle interior CB. Accordingly, the vehicle V can travel by the electric power stored in the driving battery unit IPU.

A pair of left and right front seats 61L, 61R and a rear seat 62 extending over substantially an entire region in a vehicle width direction inside the vehicle interior CB behind the front seats 61L, 61R are provided inside the vehicle interior CB.

The floor panel 50 has a bottom surface portion 51 extending in a front-rear direction and the vehicle width direction over substantially the entire region of the vehicle interior CB including the lower side of the pair of left and right front seats 61L, 61R. A floor tunnel portion 52 protruding upward from the bottom surface portion 51 is formed between the pair of left and right front seats 61L, 61R in the vehicle width direction on the bottom surface portion 51. The floor tunnel portion 52 extends in the front-rear direction.

In the floor tunnel portion 52, a charger CHGR is accommodated in front of the driving battery unit IPU. The charger CHGR is electrically connected to a power receiving unit (not shown) provided in the vehicle V. The power receiving unit can receive electric power from the outside of the vehicle V, and the charger CHGR is an electrical component that converts the electric power received by the power receiving unit and supplies the converted electric power to the driving battery unit IPU.

Figure 4:
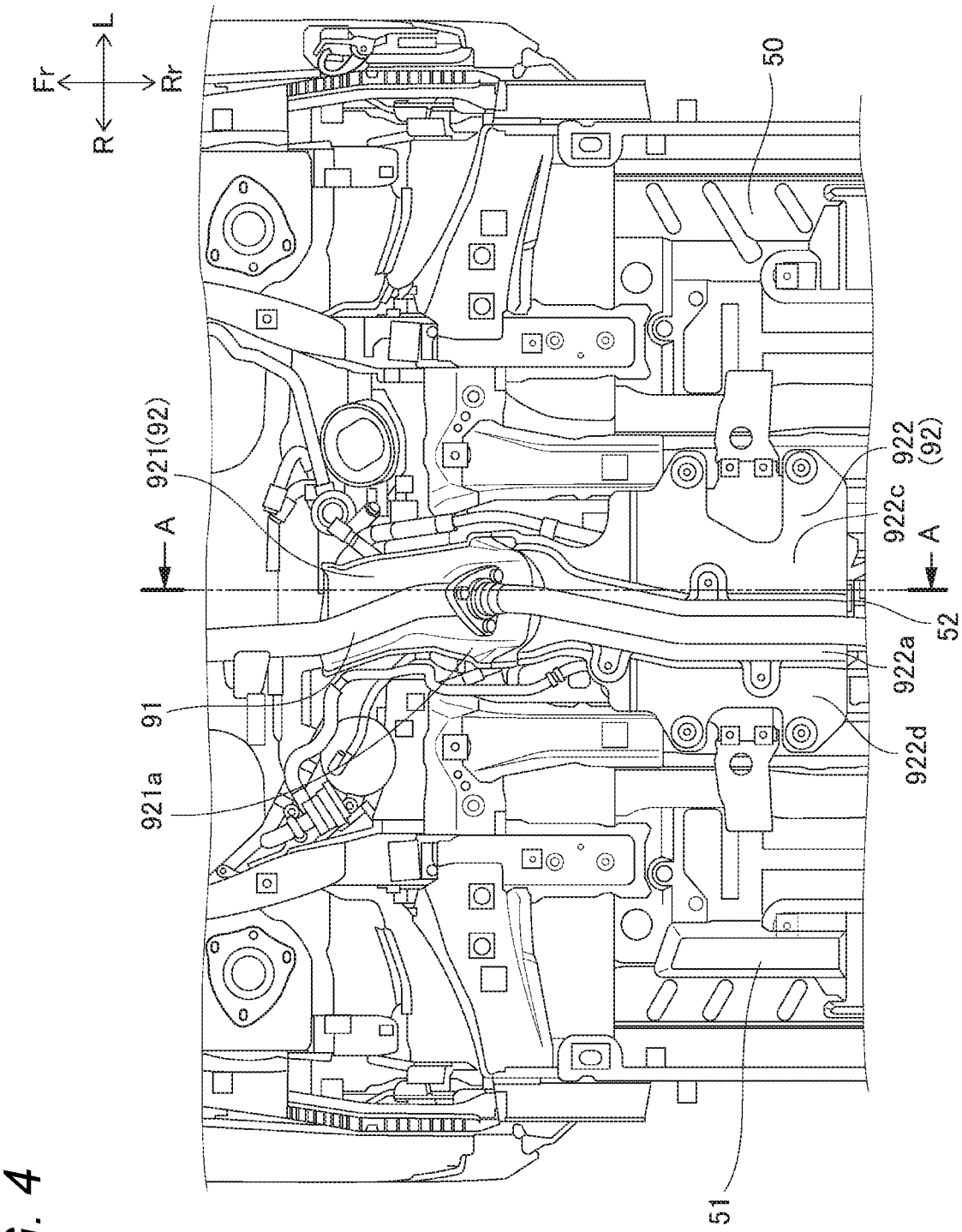
FIG. 4 is a lower surface view of a lower surface of the vehicle of FIG. 1 as viewed from below.

As shown in FIG. 4, an exhaust pipe 91 that extends in the front-rear direction and through which exhaust gas of the internal combustion engine ICE flows is disposed below the floor tunnel portion 52.

Further, a heat shielding member 92 formed of a heat insulating material or a heat shielding material is disposed below the floor panel 50 and above the exhaust pipe 91. The heat shielding member 92 is disposed to cross the exhaust pipe 91 when viewed from the upper-lower direction.

The heat shielding member 92 is divided into a front heat shielding plate 921 and a rear heat shielding plate 922 in the front-rear direction. Details of the heat shielding member 92 will be described later.

Configuration of Thermal Management System

Figure 2:
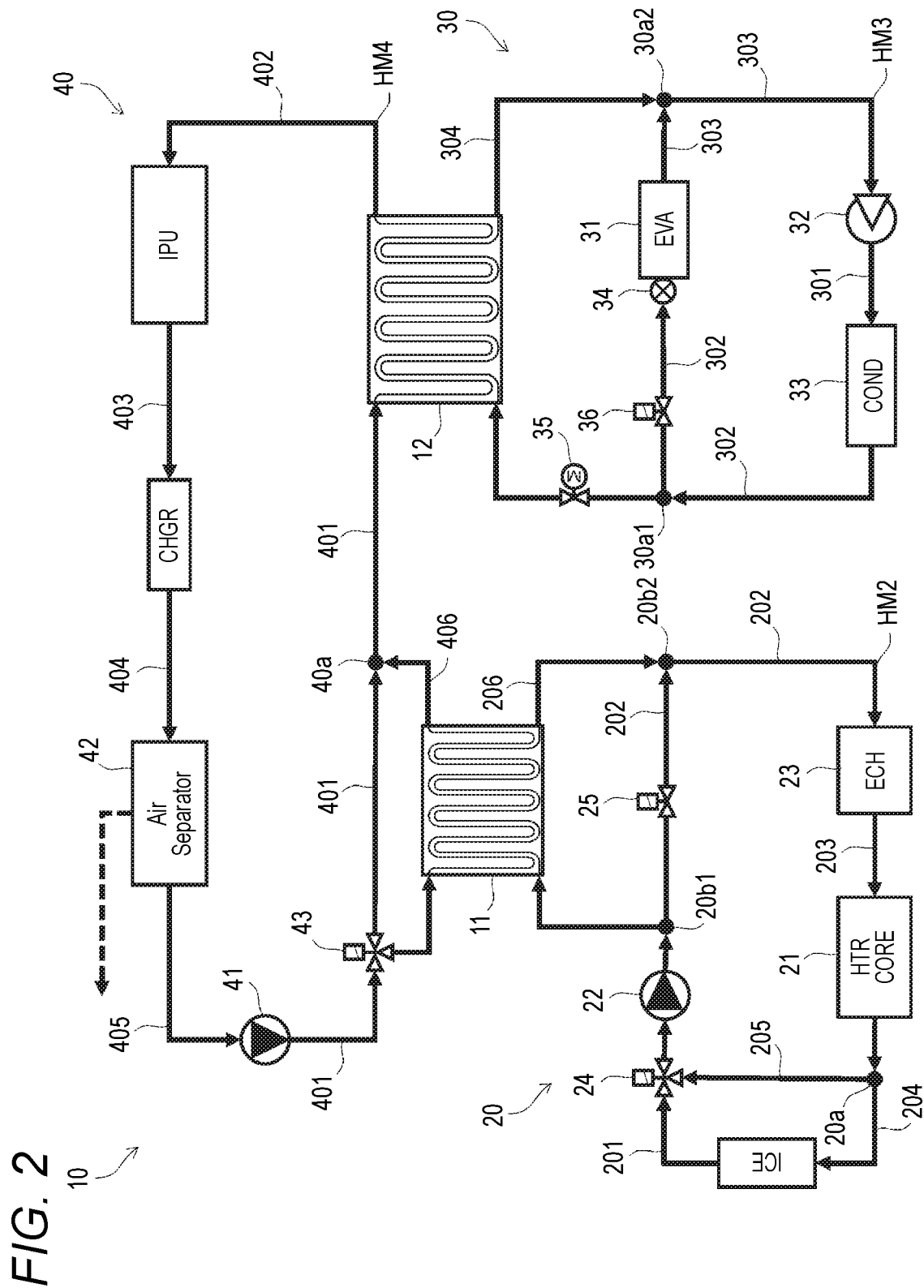
FIG. 2 is a circuit diagram of a thermal management system for the vehicle shown in FIG. 1.

As shown in FIG. 2, the vehicle V includes a heat management system 10.

The heat management system 10 includes a vehicle interior heating circuit 20 including the heater core 21 that heats air in the vehicle interior CB by exhaust heat from the internal combustion engine ICE, a vehicle interior cooling circuit 30 including the evaporator 31 that cools the air in the vehicle interior CB, and a battery temperature control circuit 40 that controls a temperature of the driving battery unit IPU.

Vehicle Interior Heating Circuit

In addition to the heater core 21, the internal combustion engine ICE, an electric pump 22, and a water heating heater 23 are connected to the vehicle interior heating circuit 20. A heat medium HM2 for heating a vehicle interior circulates in the vehicle interior heating circuit 20. The heat medium HM2 for heating a vehicle interior is, for example, water. The vehicle interior heating circuit 20 includes a first heat medium flow path 201 connecting the internal combustion engine ICE to the electric pump 22, a second heat medium flow path 202 connecting the electric pump 22 to the water heating heater 23, a third heat medium flow path 203 connecting the water heating heater 23 to the heater core 21, and a fourth heat medium flow path 204 connecting the heater core 21 to the internal combustion engine ICE.

The heat medium HM2 for heating a vehicle interior that passes through the internal combustion engine ICE and is increased in temperature is supplied to the electric pump 22 through the first heat medium flow path 201. The heat medium HM2 for heating a vehicle interior supplied to the electric pump 22 is pressure-fed to the second heat medium flow path 202 by the electric pump 22, passes through the water heating heater 23, and is supplied to the heater core 21 through the third heat medium flow path 203. In this way, the heat medium HM2 for heating a vehicle interior that passes through the internal combustion engine ICE and is increased in temperature is supplied to the heater core 21. Outside air or air circulating in the vehicle interior CB is supplied to the vehicle interior CB through the heater core 21 by a blower or the like (not shown), so that warm air is supplied to the vehicle interior CB. The heat medium HM2 for heating a vehicle interior flowing through the heater core 21 returns to the internal combustion engine ICE through the fourth heat medium flow path 204, and is increased in temperature again. In this way, the heat medium HM2 for heating a vehicle interior circulates in the vehicle interior heating circuit 20.

The water heating heater 23 has, for example, a heat source that generates heat by electricity. The water heating heater 23 is a heat exchanger that performs heat exchange between the heat medium HM2 for heating a vehicle interior and the heat source. For example, when the vehicle V is driven by power of the rotary electric machine MG described above, the internal combustion engine ICE may not be driven even when the vehicle V travels. For example, when the internal combustion engine ICE is not driven and does not generate heat, the water heating heater 23 raises the temperature of the heat medium HM2 for heating a vehicle interior flowing through the vehicle interior heating circuit 20. Accordingly, even when the internal combustion engine ICE is not driven and does not generate heat, the warm air can be supplied into the vehicle interior CB by supplying the high-temperature heat medium HM2 for heating a vehicle interior to the heater core 21.

A three-way adjustment valve 24 is provided in the first heat medium flow path 201, that is, between the internal combustion engine ICE and the electric pump 22. Further, a branch 20a is provided in the fourth heat medium flow path 204, that is, between the heater core 21 and the internal combustion engine ICE. The vehicle interior heating circuit 20 further includes a bypass flow path 205 that connects the branch 20a to the three-way adjustment valve 24.

Accordingly, the heat medium HM2 for heating a vehicle interior flowing through the heater core 21 is branched at the branch 20a. Then, a part of the heat medium HM2 for heating a vehicle interior flowing through the heater core 21 flows to the internal combustion engine ICE through the fourth heat medium flow path 204, and the remaining heat medium HM2 for heating a vehicle interior is supplied from the three-way adjustment valve 24 to the electric pump 22 through the bypass flow path 205 without flowing through the internal combustion engine ICE. By adjusting an opening degree of each valve of the three-way adjustment valve 24, a flow rate of the heat medium HM2 for heating a vehicle interior flowing through the vehicle interior heating circuit 20 can be adjusted, and further, the ratio of a flow rate of the heat medium HM2 for heating a vehicle interior flowing through the fourth heat medium flow path 204 to the internal combustion engine ICE to a flow rate of the heat medium HM2 for heating a vehicle interior supplied from the three-way adjustment valve 24 to the electric pump 22 through the bypass flow path 205 without flowing through the internal combustion engine ICE can be adjusted. Accordingly, it is possible to adjust the flow rate and the temperature of the heat medium HM2 for heating a vehicle interior that flows through the heater core 21, and it is possible to adjust the temperature of the warm air that passes through the heater core 21 and is supplied into the vehicle interior CB.

A branch 20b1 and a merging portion 20b2 are provided in the second heat medium flow path 202, that is, between the electric pump 22 and the water heating heater 23. The merging portion 20b2 is provided downstream of the branch 20b1, that is, between the branch 20b1 and the water heating heater 23. The vehicle interior heating circuit 20 further includes a branching flow path 206 that branches from the second heat medium flow path 202 at the branch 20b1 and merges with the second heat medium flow path 202 at the merging portion 20b2. The branching flow path 206 is provided in parallel with the second heat medium flow path 202. A warmer 11 is connected to the branching flow path 206. The warmer 11 is a heat exchanger that performs heat exchange between the heat medium HM2 for heating a vehicle interior flowing through the branching flow path 206 and a battery temperature control medium HM4 flowing through a battery temperature control circuit 40 to be described later to heat the battery temperature control medium HM4.

A shutoff valve 25 is provided between the branch 20b1 and the merging portion 20b2 of the second heat medium flow path 202. When the shutoff valve 25 is closed, the heat medium HM2 for heating a vehicle interior does not flow between the branch 20b1 and the merging portion 20b2 of the second heat medium flow path 202, and all the heat medium HM2 for heating a vehicle interior pressure-fed from the electric pump 22 is supplied to the warmer 11.

Vehicle Interior Cooling Circuit

In addition to the evaporator 31, a compressor 32, the condenser 33, and an expansion valve 34 are connected to the vehicle interior cooling circuit 30. A heat medium HM3 for cooling a vehicle interior is circulated in the vehicle interior cooling circuit 30. The heat medium HM3 for cooling a vehicle interior is, for example, a synthetic gas generally referred to as alternative for chlorofluorocarbon. The vehicle interior cooling circuit 30 includes a first heat medium flow path 301 connecting the compressor 32 to the condenser 33, a second heat medium flow path 302 connecting the condenser 33 to the expansion valve 34, and a third heat medium flow path 303 connecting the evaporator 31 to the compressor 32. The expansion valve 34 is connected to an inlet port of the evaporator 31 that introduces the heat medium HM3 for cooling a vehicle interior into the evaporator 31.

The heat medium HM3 for cooling a vehicle interior that is compressed by the compressor 32 and increased in temperature is supplied to the condenser 33 through the first heat medium flow path 301. The heat medium HM3 for cooling a vehicle interior supplied to the condenser 33 is cooled by dissipating heat thereof by a condenser fan (not shown) in the condenser 33. The heat medium HM3 for cooling a vehicle interior cooled by the condenser 33 is supplied to the expansion valve 34 connected to the inlet port of the evaporator 31 through the second heat medium flow path 302. The expansion valve 34 is provided with a minute nozzle hole, and the heat medium HM3 for cooling a vehicle interior supplied to the expansion valve 34 is injected from the nozzle hole, rapidly expands, and is supplied to the evaporator 31 through the inlet port of the evaporator 31. The heat medium HM3 for cooling a vehicle interior, which rapidly expands and is supplied to the evaporator 31, absorbs heat around the evaporator 31 to cool the evaporator 31. Then, outside air or air circulating in the vehicle interior CB is supplied to the vehicle interior CB through the evaporator 31 by a blower or the like (not shown), so that cold air is supplied to the vehicle interior CB. The heat medium HM3 for cooling a vehicle interior flowing through the evaporator 31 returns to the compressor 32 through the third heat medium flow path 303, and is compressed again and increased in temperature. In this way, the heat medium HM3 for cooling a vehicle interior circulates in the vehicle interior cooling circuit 30.

A driving rotation speed of the compressor 32 may be variably controlled by an inverter. By variably controlling the driving rotation speed of the compressor 32 by the inverter, it is possible to adjust a flow rate of the heat medium HM3 for cooling a vehicle interior circulating in the vehicle interior cooling circuit 30. Further, the expansion valve 34 may be capable of adjusting the flow rate of the heat medium HM3 for cooling a vehicle interior injected from the nozzle hole. Thus, the flow rate of the heat medium HM3 for cooling a vehicle interior flowing through the evaporator 31 can be adjusted, and the temperature of the cold air passing through the evaporator 31 and supplied into the vehicle interior CB can be adjusted.

A branch 30a1 is provided in the second heat medium flow path 302, that is, between the condenser 33 and the expansion valve 34, and a merging portion 30a2 is provided in the third heat medium flow path 303, that is, between the evaporator 31 and the compressor 32. The vehicle interior cooling circuit 30 further includes a branching flow path 304 that branches from the second heat medium flow path 302 at the branch 30a1 and merges with the third heat medium flow path 303 at the merging portion 30a2. A chiller 12 is connected to the branching flow path 304. The chiller 12 is a heat exchanger that cools the battery temperature control medium HM4 by performing heat exchange between the heat medium HM3 for cooling a vehicle interior flowing through the branching flow path 304 and the battery temperature control medium HM4 flowing through the battery temperature control circuit 40 to be described later. Further, in the branching flow path 304, an electric valve 35 is provided between the branch 30a1 and the chiller 12. The electric valve 35 can adjust the flow rate of the heat medium HM3 for cooling a vehicle interior, which flows through the branching flow path 304 and is supplied to the chiller 12.

A shutoff valve 36 is provided between the branch 30a1 of the second heat medium flow path 302 and the expansion valve 34. When the shutoff valve 36 is closed, the heat medium HM3 for cooling a vehicle interior is not supplied from the branch 30a1 of the second heat medium flow path 302 to the expansion valve 34, and all of the heat medium HM3 for cooling a vehicle interior cooled by the condenser 33 is supplied to the chiller 12.

Battery Temperature Control Circuit

In addition to the driving battery unit IPU, an electric pump 41, the chiller 12, the charger CHGR, and an air separator 42 are connected to the battery temperature control circuit 40. The battery temperature control medium HM4 circulates in the battery temperature control circuit 40. The battery temperature control medium HM4 is, for example, water. The battery temperature control circuit 40 includes a first heat medium flow path 401 connecting the electric pump 41 to the chiller 12, a second heat medium flow path 402 connecting the chiller 12 to the driving battery unit IPU, a third heat medium flow path 403 connecting the driving battery unit IPU to the charger CHGR, a fourth heat medium flow path 404 connecting the charger CHGR to the air separator 42, and a fifth heat medium flow path 405 connecting the air separator 42 to the electric pump 41.

The battery temperature control medium HM4 pressure-fed from the electric pump 41 is supplied to the chiller 12 through the first heat medium flow path 401. The battery temperature control medium HM4 supplied to the chiller 12 is cooled by heat exchange with the heat medium HM3 for cooling a vehicle interior supplied to the chiller 12 through the branching flow path 304 of the vehicle interior cooling circuit 30. The battery temperature control medium HM4 cooled by the chiller 12 is supplied to the driving battery unit IPU through the second heat medium flow path 402 to cool the driving battery unit IPU. The battery temperature control medium HM4 that has cooled the driving battery unit IPU is supplied to the charger CHGR through the second heat medium flow path 402 to cool the charger CHGR. The battery temperature control medium HM4 that has cooled the charger CHGR is supplied to the air separator 42 through the fourth heat medium flow path 404. When air bubbles are included in the battery temperature control medium HM4 supplied to the air separator 42, the air bubbles are separated and removed. Then, the battery temperature control medium HM4 from which the air bubbles are removed by the air separator 42 returns to the electric pump 41 through the fifth heat medium flow path 405, and is pressure-fed to the chiller 12 through the first heat medium flow path 401 again. At this time, since air bubbles are removed from the battery temperature control medium HM4 supplied to the electric pump 41 by the air separator 42, it is possible to reduce a fluctuation range of the rotation speed of the electric pump 41 caused by the air bubbles mixed into the battery temperature control medium HM4. Accordingly, the battery temperature control medium HM4 can be pressure-fed from the electric pump 41 at a stable pressure.

A three-way adjustment valve 43 and a merging portion 40a are provided in the first heat medium flow path 401, that is, between the electric pump 41 and the chiller 12. The merging portion 40a is provided downstream of the three-way adjustment valve 43, that is, between the three-way adjustment valve 43 and the chiller 12. The battery temperature control circuit 40 further includes a branching flow path 406 that branches from the first heat medium flow path 401 at the three-way adjustment valve 43 and merges with the first heat medium flow path 401 at the merging portion 40a. The warmer 11 is connected to the branching flow path 406.

For example, when the driving battery unit IPU is in a low-temperature state, such as immediately after the start of the vehicle V, each valve of the three-way adjustment valve 43 is adjusted, and the battery temperature control medium HM4 flows into the branching flow path 406 and is supplied to the warmer 11. The warmer 11 performs heat exchange between the heat medium HM2 for heating a vehicle interior flowing through the branching flow path 206 of the vehicle interior heating circuit 20 and the battery temperature control medium HM4 flowing through the branching flow path 406 of the battery temperature control circuit 40 to heat the battery temperature control medium HM4. The battery temperature control medium HM4 heated by the warmer 11 passes through the first heat medium flow path 401 and the second heat medium flow path 402 and is supplied to the driving battery unit IPU, so that the temperature of the driving battery unit IPU can be increased. Accordingly, the temperature of the driving battery unit IPU can be increased when the driving battery unit IPU is in the low-temperature state. When the battery temperature control medium HM4 is heated by the warmer 11 from the three-way adjustment valve 43 through the branching flow path 406, the electric valve 35 provided in the branching flow path 304 of the vehicle interior cooling circuit 30 is preferably controlled to be in a fully close state. Accordingly, since the battery temperature control medium HM4 heated by the warmer 11 can be supplied to the driving battery unit IPU without being cooled by the chiller 12, the driving battery unit IPU can be more effectively heated.

Further, by adjusting an opening degree of each valve of the three-way adjustment valve 43, a flow rate of the battery temperature control medium HM4 flowing through the battery temperature control circuit 40 can be adjusted, and further, the ratio of a flow rate of the battery temperature control medium HM4 flowing from the three-way adjustment valve 43 to the chiller 12 through the first heat medium flow path 401 to a flow rate of the battery temperature control medium HM4 flowing from the three-way adjustment valve 43 to the chiller 12 through the branching flow path 406 and heated by the warmer 11 can be adjusted. Accordingly, it is possible to adjust the flow rate and the temperature of the battery temperature control medium HM4 supplied to the driving battery unit IPU.

Assembly of Bracket to Which Plurality of Heat Exchangers Are Fixed to Vehicle

Figure 3:
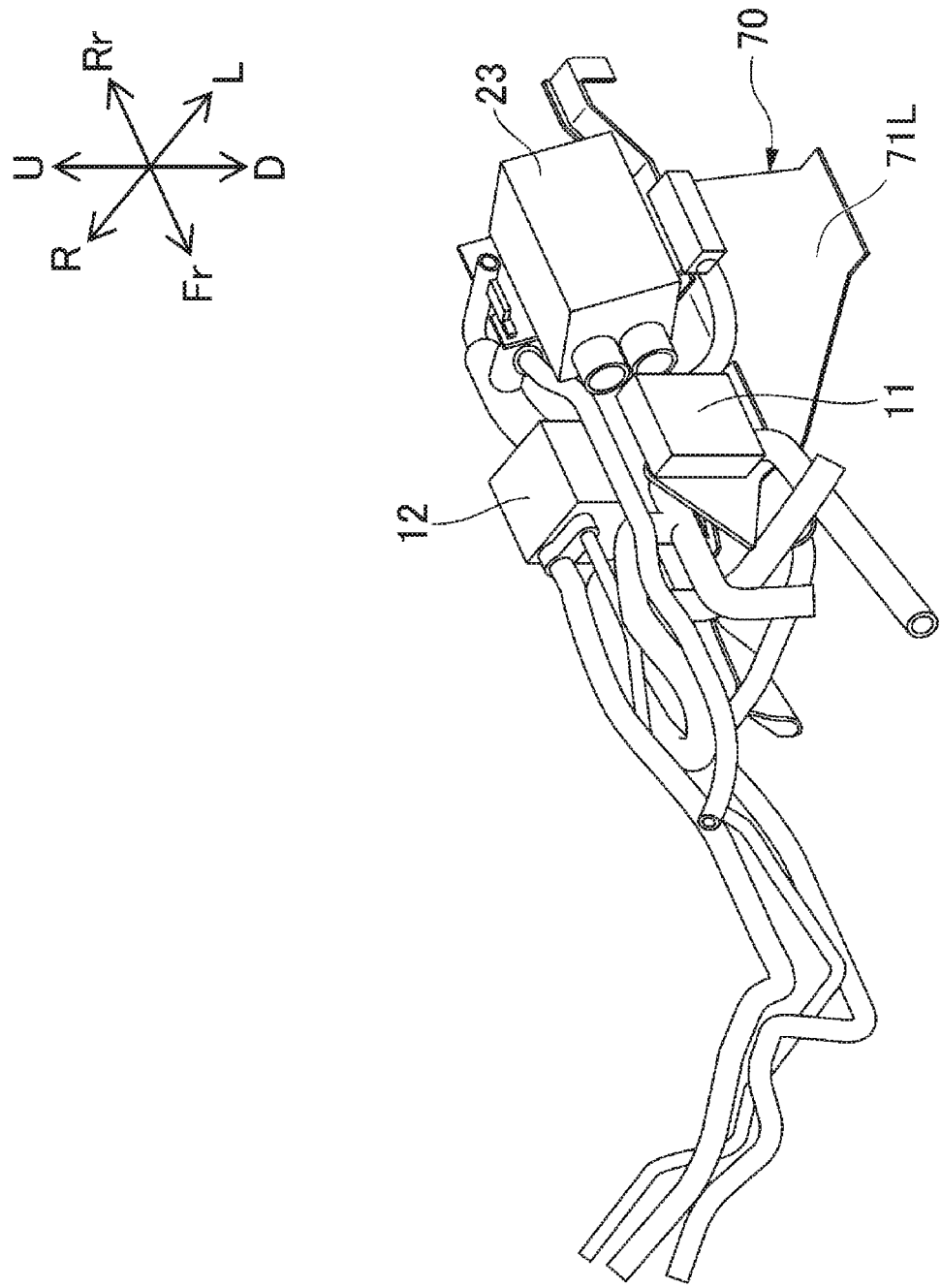
FIG. 3 is a perspective view showing a state in which a warmer, a chiller, and a water heating heater are fixed to a bracket in the vehicle of FIG. 1.

As shown in FIG. 3, the vehicle V further includes a bracket 70 that fixes the warmer 11, the chiller 12, and the water heating heater 23. The warmer 11, the chiller 12, and the water heating heater 23 are fixed to an upper surface of the bracket 70.

Figure 6:
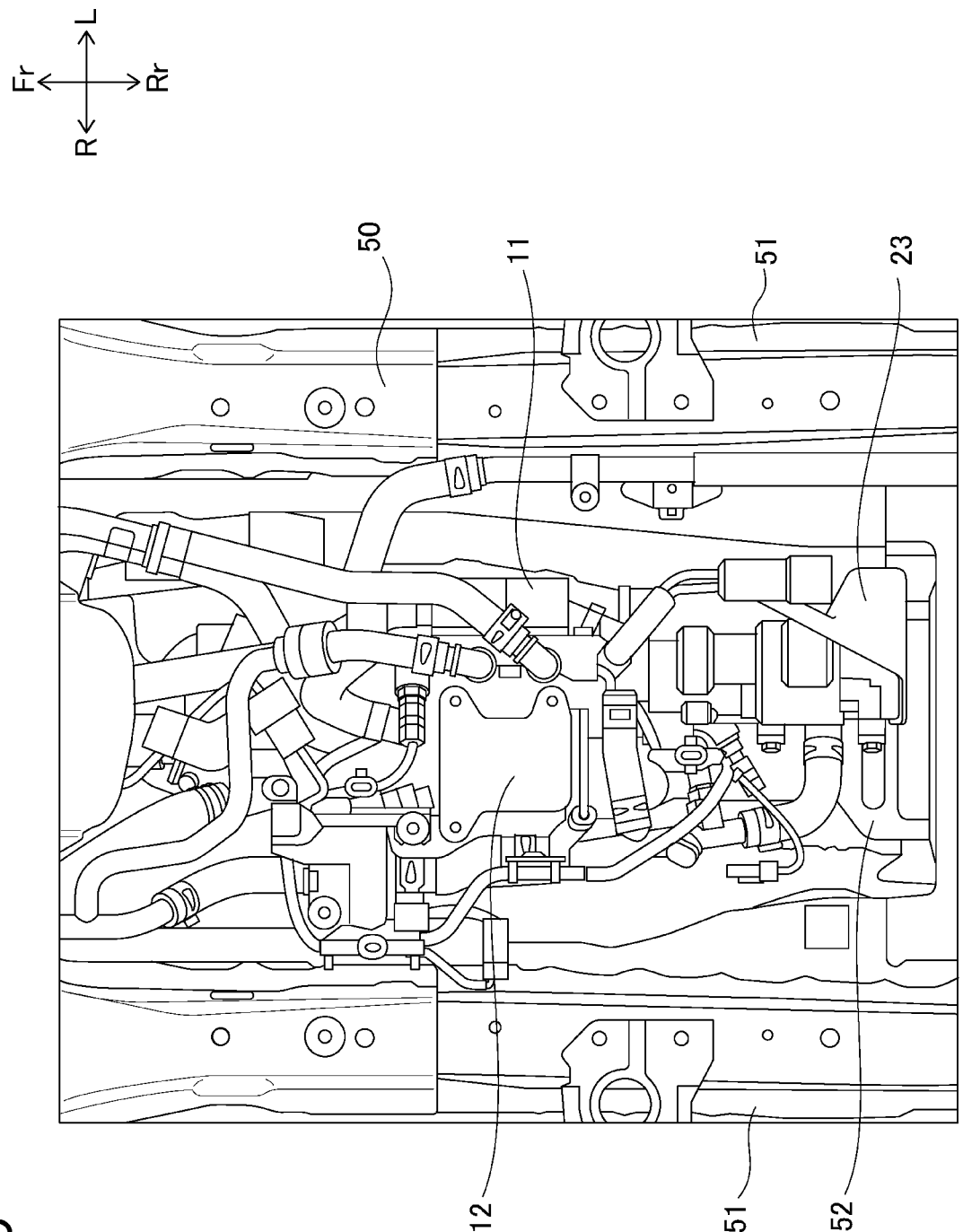
FIG. 6 is a view of the lower surface of the vehicle of FIG. 5 as viewed from below in a state where the bracket is removed.

As shown in FIGS. 3 and 6, the bracket 70 to which the warmer 11, the water heating heater 23, and the chiller 12 are fixed is fixed to a lower side of the floor panel 50 at a position behind the front room FRM such that at least a part of the bracket 70 overlaps the floor tunnel portion 52 in the vehicle width direction.

Accordingly, the plurality of heat exchangers fixed to the bracket 70, in the present embodiment, the warmer 11, the water heating heater 23, and the chiller 12 can be collectively assembled to the vehicle V. Thus, when the plurality of heat exchangers are mounted outside the vehicle interior CB, assembling property to the vehicle V is improved.

Further, since the plurality of heat exchangers fixed to the bracket 70, in the present embodiment, the warmer 11, the water heating heater 23, and the chiller 12 can be disposed outside the front room FRM, the size of the front room FRM can be reduced.

Figure 5:
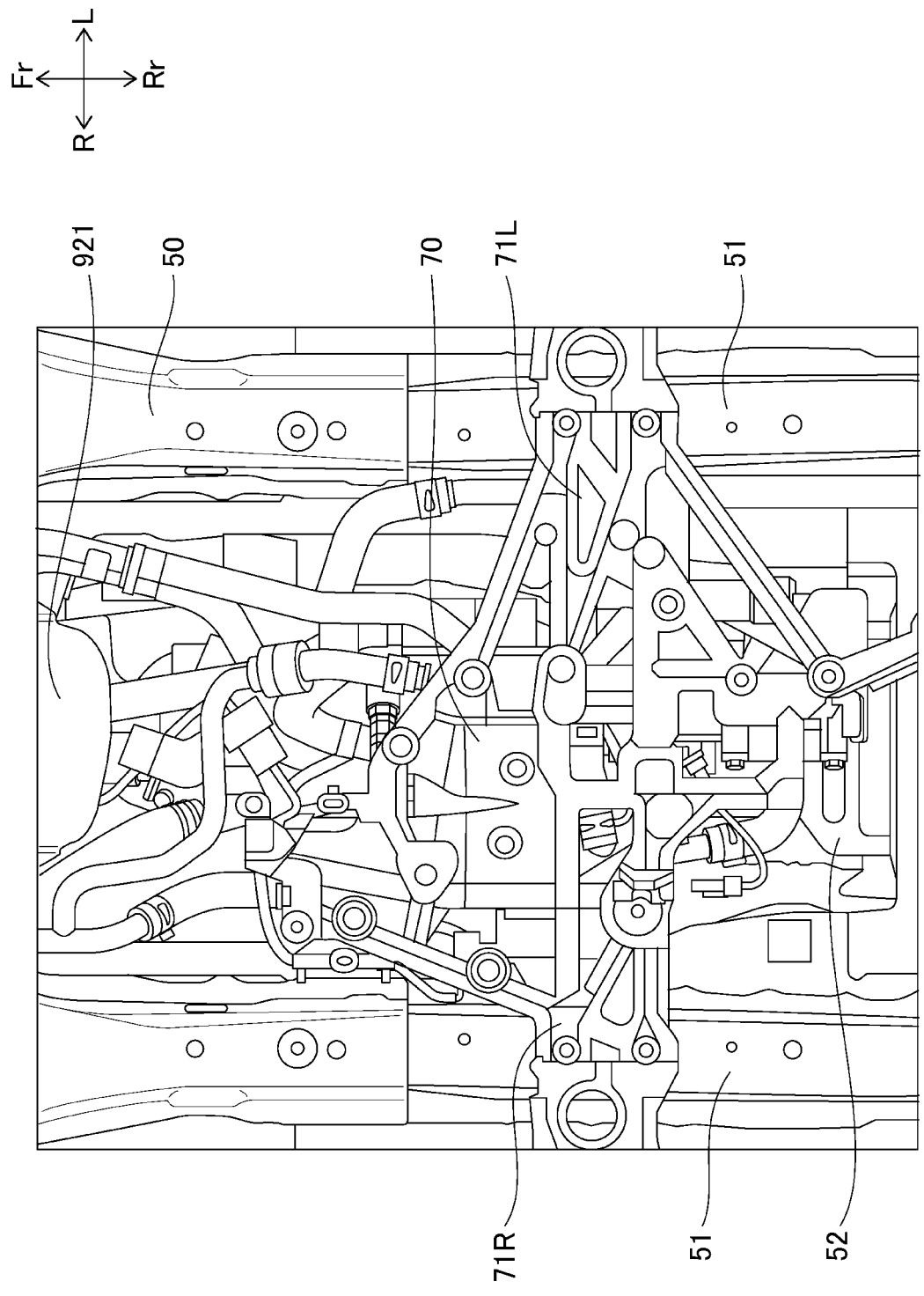
FIG. 5 is an enlarged view of a main part of the vicinity of the bracket on the lower surface of the vehicle in FIG. 3 as viewed from below in a state where a rear heat shielding plate is removed.

As shown in FIGS. 5 and 6, the bracket 70 is disposed such that the warmer 11, the water heating heater 23, and the chiller 12 overlap the floor tunnel portion 52 when viewed from the upper-lower direction. The warmer 11, the water heating heater 23, and the chiller 12 fixed to the bracket 70 are accommodated inside the floor tunnel portion 52.

Accordingly, since the warmer 11, the water heating heater 23, and the chiller 12 can be disposed by effectively utilizing a space below the floor tunnel portion 52, the warmer 11, the water heating heater 23, and the chiller 12 can be disposed outside the front room FRM with high space efficiency.

Further, the warmer 11, the water heating heater 23, and the chiller 12 fixed to the bracket 70 are disposed in the front-rear direction between the internal combustion engine ICE, the heater core 21, and the evaporator 31 accommodated in the front room FRM and the driving battery unit IPU disposed in the rear portion of the vehicle V.

Accordingly, the warmer 11, the water heating heater 23, and the chiller 12 are disposed at positions where distances between the internal combustion engine ICE, the heater core 21, and the evaporator 31, and the warmer 11, the water heating heater 23, and the chiller 12, and distances between the driving battery unit IPU and the warmer 11, the water heating heater 23, and the chiller 12 are both shortened. Accordingly, it is possible to prevent an increase in a flow path length of the vehicle interior heating circuit 20, a flow path length of the vehicle interior cooling circuit 30, and a flow path length of the battery temperature control circuit 40.

Further, in the present embodiment, the water heating heater 23 is disposed behind the warmer 11 and the chiller 12. The water heating heater 23 and the warmer 11 are arranged in the front-rear direction below the floor tunnel portion 52, and the water heating heater 23 and the chiller 12 are arranged in the front-rear direction below the floor tunnel portion 52.

Accordingly, it is possible to prevent an increase in the dimension of the floor tunnel portion 52 of the floor panel 50 in the vehicle width direction and to dispose the water heating heater 23, the warmer 11, and the chiller 12 below the floor tunnel portion 52.

Further, the plurality of heat exchangers fixed to the bracket 70, in the present embodiment, the warmer 11, the water heating heater 23, and the chiller 12 are fixed to the lower side of the floor panel 50 via the bracket 70 such that the warmer 11, the water heating heater 23, and the chiller 12 are located behind the front room FRM, above the heat shielding member 92, and at least partially overlap the heat shielding member 92 when viewed from the upper-lower direction.

Accordingly, the heat shielding member 92 can prevent the plurality of heat exchangers fixed to the bracket 70, in the present embodiment, the warmer 11, the water heating heater 23, and the chiller 12 from receiving the heat released from the exhaust gas of the internal combustion engine ICE flowing through the exhaust pipe 91.

The bracket 70 is provided with a pair of frame members 71L, 71R extending outward in the vehicle width direction of the floor tunnel portion 52 when viewed from below. The frame member 71L is fixed to the floor panel 50 by bolts at a position on a left side of the floor tunnel portion 52. The frame member 71R is fixed to the floor panel 50 by bolts at a position on a right side of the floor tunnel portion 52. In this way, the bracket 70 is fixed to the floor panel 50 at both outer sides of the floor tunnel portion 52 in the vehicle width direction across the floor tunnel portion 52 when viewed from the front-rear direction.

Accordingly, the rigidity of the floor panel 50 in the vehicle width direction is improved, and noise and vibration generated in the floor panel 50 during driving of the vehicle V or the like are reduced.

Configuration of Heat Shielding Member

Figure 7:
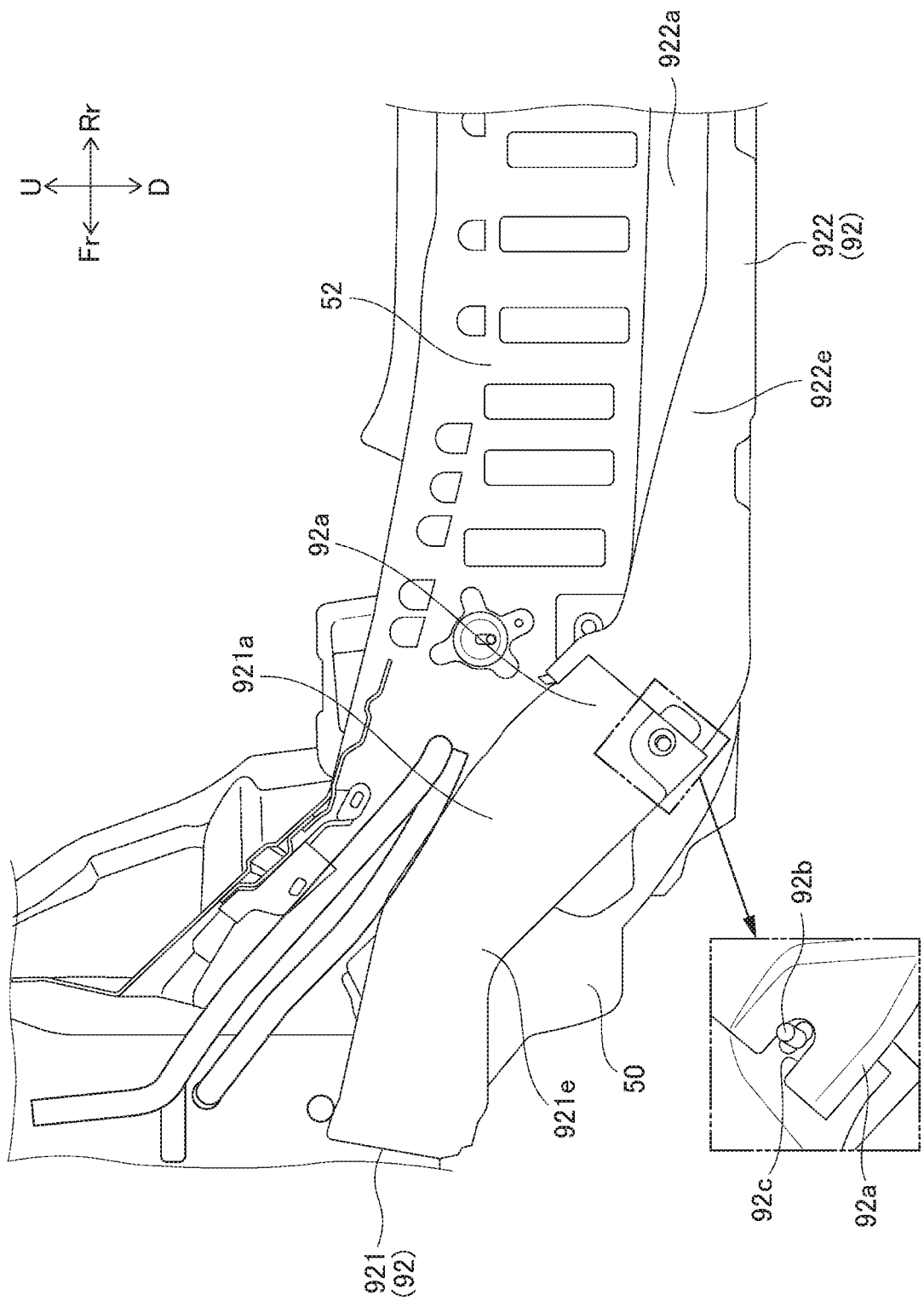
FIG. 7 is a cross-sectional view taken along a line A-A of FIG. 4.

As shown in FIGS. 4, 5, and 7, the heat shielding member 92 is divided into the front heat shielding plate 921 and the rear heat shielding plate 922 in the front-rear direction.

Accordingly, when maintenance is required for at least one of the warmer 11, the water heating heater 23, and the chiller 12, it is possible to access the warmer 11, the water heating heater 23, and the chiller 12 by removing only one of the front heat shielding plate 921 and the rear heat shielding plate 922 from the vehicle V. This facilitates the work during maintenance of one of the plurality of heat exchangers fixed to the bracket 70.

In this way, it is possible to reduce the size of the front room FRM by disposing the plurality of heat exchangers behind the front room FRM, and it is possible to prevent the plurality of heat exchangers fixed to the bracket 70 from receiving the heat released from the exhaust gas of the internal combustion engine ICE flowing through the exhaust pipe 91 while preventing the work during maintenance of the plurality of heat exchangers fixed to the bracket 70 from becoming complicated.

The front heat shielding plate 921 is inclined downward toward the rear and extends in the front-rear direction. The front heat shielding plate 921 is provided with a tunnel portion 921a protruding upward in a convex shape so as to cross the exhaust pipe 91. The tunnel portion 921a extends in the front-rear direction along the extending direction of the exhaust pipe 91. The front heat shielding plate 921 is temporarily fixed to the floor panel 50 by bolts or the like (not shown).

The rear heat shielding plate 922 is connected to a rear portion of the front heat shielding plate 921 and extends in the front-rear direction. In the rear heat shielding plate 922, a tunnel portion 922a protruding upward in a convex shape is formed to cross the exhaust pipe 91. The tunnel portion 922a extends in the front-rear direction along the extending direction of the exhaust pipe 91. The tunnel portion 921a of the front heat shielding plate 921 and the tunnel portion 922a of the rear heat shielding plate 922 have a tunnel shape extending continuously in the front-rear direction. The exhaust pipe 91 extends in the front-rear direction through the tunnel portion 921a of the front heat shielding plate 921 and the tunnel portion 922a of the rear heat shielding plate 922.

The rear heat shielding plate 922 is provided with support panel portions 922c, 922d extending to both outer sides of the tunnel portion 922a in the vehicle width direction. Each of the support panel portions 922c, 922d is provided with a plurality of bolt insertion holes penetrating in the front-rear direction. The rear heat shielding plate 922 is fixed to the floor panel 50 by inserting bolts into the bolt insertion holes from below and fastening the bolts to the floor panel 50. Accordingly, the heat shielding member 92 including the front heat shielding plate 921 and the rear heat shielding plate 922 is fixed to the floor panel 50.

The plurality of heat exchangers fixed to the bracket 70, in the present embodiment, the warmer 11, the water heating heater 23, and the chiller 12 are disposed in a region overlapping only one of the front heat shielding plate 921 and the rear heat shielding plate 922 when viewed from the upper-lower direction. In the present embodiment, the warmer 11, the water heating heater 23, and the chiller 12 are disposed in a region overlapping only the rear heat shielding plate 922 of the front heat shielding plate 921 and the rear heat shielding plate 922 when viewed from the upper-lower direction.

Accordingly, by removing only one of the front heat shielding plate 921 and the rear heat shielding plate 922 from the vehicle V, the warmer 11, the water heating heater 23, and the chiller 12 are exposed. This further facilitates the work during maintenance of the plurality of heat exchangers fixed to the bracket 70.

As shown in FIG. 7, the heat shielding member 92 includes an overlapping portion 92a where the front heat shielding plate 921 and the rear heat shielding plate 922 overlap each other. In the overlapping portion 92a, the front heat shielding plate 921 is provided with a pin-shaped protruding portion 92b protruding toward the rear heat shielding plate 922. The rear heat shielding plate 922 is provided with an engagement portion 92c with which the protruding portion 92b is engaged. In the present embodiment, the engagement portion 92c is a cutout groove that is cut out rearward from a front end of the rear heat shielding plate 922.

Accordingly, when the heat shielding member 92 is assembled to the floor panel 50, the protruding portion 92b of the front heat shielding plate 921 is engaged with the engagement portion 92c of the rear heat shielding plate 922, and the front heat shielding plate 921 and the rear heat shielding plate 922 are aligned with each other, so that the heat shielding member 92 can be assembled to the floor panel 50. Accordingly, assembling property when assembling the heat shielding member 92 divided in the front-rear direction to the floor panel 50 is improved.

The front heat shielding plate 921 has an embossing region 921e where embossing is performed in a region other than the overlapping portion 92a. In the embossing region 921e, an embossment having a fine uneven shape is formed. The fine uneven shape is, for example, a shape in which a large number of fine protrusions having any shape such as a spherical shape or a cylindrical shape are formed. In the present embodiment, the embossing region 921e is substantially the entire region excluding the overlapping portion 92a.

The rear heat shielding plate 922 has an embossing region 922e where embossing is performed in a region other than the overlapping portion 92a. In the embossing region 922e, an embossment having a fine uneven shape is formed. The fine uneven shape is, for example, a shape in which a large number of fine protrusions having any shape such as a spherical shape or a cylindrical shape are formed. In the present embodiment, the embossing region 922e is substantially the entire region excluding the overlapping portion 92a. The fine uneven shape processed in the embossing region 921e of the front heat shielding plate 921 and the fine uneven shape processed in the embossing region 922e of the rear heat shielding plate 922 may have the same shape or different shapes.

Since the rigidity of the front heat shielding plate 921 and the rear heat shielding plate 922 is improved by performing embossing on the front heat shielding plate 921 and the rear heat shielding plate 922, the front heat shielding plate 921 and the rear heat shielding plate 922 can be made thin, and weight reduction and cost reduction can be achieved.

On the other hand, the overlapping portion 92a of the front heat shielding plate 921 and the rear heat shielding plate 922 is formed with an embossment having an uneven height smaller than an uneven height of the embossments of the embossing regions 921e, 922e, or is not embossed.

Accordingly, since the uneven height of the front heat shielding plate 921 and the rear heat shielding plate 922 in the overlapping portion 92a is lower than the uneven height of the embossing regions 921e, 922e, when the protruding portion 92b of the front heat shielding plate 921 is engaged with the engagement portion 92c of the rear heat shielding plate 922 and the front heat shielding plate 921 and the rear heat shielding plate 922 are aligned with each other, the workability of work of engaging the protruding portion 92b of the front heat shielding plate 921 with the engagement portion 92c of the rear heat shielding plate 922 is not reduced.

In this way, the front heat shielding plate 921 and the rear heat shielding plate 922 can be made thin without deteriorating the assembling property when assembling the heat shielding members 92 divided in the front-rear direction to the floor panel 50, and weight reduction and cost reduction can be achieved.

Although an embodiment of the present disclosure has been described above with reference to the accompanying drawings, it is needless to say that the present disclosure is not limited to the embodiment. It is apparent that those skilled in the art can conceive of various modifications and alterations within the scope described in the claims, and it is understood that such modifications and alterations naturally fall within the technical scope of the present disclosure. In addition, components in the above embodiment may be freely combined without departing from the gist of the disclosure.

For example, the rotary electric machine MG capable of driving the drive wheels of the vehicle V may be accommodated in the front room FRM or may be disposed behind the vehicle interior CB.

Further, for example, in the present embodiment, the warmer 11, the water heating heater 23, and the chiller 12 are disposed in the region overlapping only the rear heat shielding plate 922 of the front heat shielding plate 921 and the rear heat shielding plate 922 when viewed from the upper-lower direction, but may be disposed in a region overlapping only the front heat shielding plate 921.

Further, for example, in the present embodiment, the embossing region 921e of the front heat shielding plate 921 is substantially the entire region excluding the overlapping portion 92a, the embossing region 922e of the rear heat shielding plate 922 is substantially the entire region excluding the overlapping portion 92a, but the embossing region 921e of the front heat shielding plate 921 and the embossing region 922e of the rear heat shielding plate 922 may be partial regions excluding the overlapping region 92a.

Further, for example, in the present embodiment, the plurality of heat exchangers fixed to the bracket 70 are the warmer 11, the water heating heater 23, and the chiller 12, but may be any two of the warmer 11, the water heating heater 23, and the chiller 12, may be heat exchangers other than the warmer 11, the water heating heater 23, and the chiller 12, or may be a combination of at least one of the warmer 11, the water heating heater 23, and the chiller 12 and one or more heat exchangers other than the warmer 11, the water heating heater 23, and the chiller 12.

In the present description, at least the following matters are described. In the parentheses, the corresponding constituent elements and the like in the above embodiment are shown as an example, but the present disclosure is not limited thereto.

(1) A vehicle (vehicle V) travelable by electric power stored in a driving battery unit, the vehicle including:

an internal combustion engine (internal combustion engine ICE);
the driving battery unit (driving battery unit IPU);
a floor panel (floor panel 50) constituting a floor surface of a vehicle interior (vehicle interior CB);
a plurality of heat exchangers (warmer 11, water heating heater 23, and chiller 12) fixed to a bracket (bracket 70); and
an exhaust pipe (exhaust pipe 91) through which exhaust gas of the internal combustion engine flows, in which
the vehicle is partitioned into the vehicle interior and a front room (front room FRM) in front of the vehicle interior by a dash panel (dash panel DP) extending upward from the floor panel,
the internal combustion engine is disposed in the front room,
the exhaust pipe extends in a front-rear direction below the floor panel,
a heat shielding member (heat shielding member 92) is disposed above the exhaust pipe so as to cross the exhaust pipe when viewed from an upper-lower direction,
the plurality of heat exchangers fixed to the bracket are fixed to a lower side of the floor panel such that the plurality of heat exchangers are located behind the front room, above the heat shielding member, and at least partially overlap the heat shielding member when viewed from the upper-lower direction, and
the heat shielding member is divided into a first heat shielding plate (front heat shielding plate 921) and a second heat shielding plate (rear heat shielding plate 922) in the front-rear direction.

According to (1), the size of the front room can be reduced by disposing the plurality of heat exchangers behind the front room, and the heat exchangers can be prevented from receiving heat released from the exhaust gas of the internal combustion engine flowing through the exhaust pipe while preventing work during maintenance of the heat exchangers from becoming complicated.

(2) The vehicle according to (1), in which
the plurality of heat exchangers fixed to the bracket are disposed in a region overlapping only one of the first heat shielding plate and the second heat shielding plate when viewed from the upper-lower direction.

According to (2), by removing only one of the first heat shielding plate and the second heat shielding plate from the vehicle, the plurality of heat exchangers fixed to the bracket are exposed. This further facilitates the work during the maintenance of the plurality of heat exchangers fixed to the bracket.

(3) The vehicle according to (1) or (2), in which
the heat shielding member includes an overlapping portion (overlapping portion 92*a*) in which the first heat shielding plate and the second heat shielding plate overlap each other,
in the overlapping portion,
a protruding portion (protruding portion 92*b*) is provided on one of the first heat shielding plate and the second heat shielding plate, and
an engagement portion (engagement portion 92*c*) with which the protruding portion is engaged is provided on the other of the first heat shielding plate and the second heat shielding plate.

According to (3), when the heat shielding member is assembled to the vehicle, the protruding portion provided on one of the first heat shielding plate and the second heat shielding plate is engaged with the engagement portion provided on the other of the first heat shielding plate and the second heat shielding plate, and the first heat shielding plate and the second heat shielding plate are aligned with each other, so that the heat shielding member can be assembled to the vehicle. Accordingly, assembling property when assembling the heat shielding member divided in the front-rear direction is improved.

(4) The vehicle according to (3), in which
each of the first heat shielding plate and the second heat shielding plate has an embossing region (embossing regions 921*e*, 922*e*) on which embossing is performed in a region other than the overlapping portion, and
the overlapping portion is formed with an embossment having an uneven height smaller than an uneven height of an embossment of the embossing region, or is not embossed.

According to (4), since the rigidity of the first heat shielding plate and the second heat shielding plate is improved by performing embossing on the first heat shielding plate and the second heat shielding plate, the first heat shielding plate and the second heat shielding plate can be made thin, and weight reduction and cost reduction can be achieved. Further, since the uneven height of the first heat shielding plate and the second heat shielding plate in the overlapping portion is lower than the unevenness height of the embossing region, workability in aligning the first heat shielding plate and the second heat shielding plate by engaging the protruding portion provided on one of the first heat shielding plate and the second heat shielding plate with the engagement portion provided on the other of the first heat shielding plate and the second heat shielding plate is not reduced.

The invention claimed is:
1. A vehicle travelable by electric power stored in a driving battery unit, the vehicle comprising:
an internal combustion engine;
the driving battery unit;
a floor panel constituting a floor surface of a vehicle interior;
a plurality of heat exchangers fixed to a bracket; and
an exhaust pipe through which exhaust gas of the internal combustion engine flows, wherein
the vehicle is partitioned into the vehicle interior and a front room in front of the vehicle interior by a dash panel extending upward from the floor panel,
the internal combustion engine is disposed in the front room,
the exhaust pipe extends in a front-rear direction below the floor panel,
a heat shielding member is disposed above the exhaust pipe so as to cross the exhaust pipe when viewed from an upper-lower direction,
the plurality of heat exchangers fixed to the bracket are fixed to a lower side of the floor panel such that the plurality of heat exchangers are located behind the front room, above the heat shielding member, and at least partially overlap the heat shielding member when viewed from the upper-lower direction, and
the heat shielding member is divided into a first heat shielding plate and a second heat shielding plate in the front-rear direction.
2. The vehicle according to claim 1, wherein
the plurality of heat exchangers fixed to the bracket are disposed in a region overlapping only one of the first heat shielding plate and the second heat shielding plate when viewed from the upper-lower direction.

3. The vehicle according to claim 1, wherein
the heat shielding member includes an overlapping portion in which the first heat shielding plate and the second heat shielding plate overlap each other,
in the overlapping portion,
a protruding portion is provided on one of the first heat shielding plate and the second heat shielding plate, and
an engagement portion with which the protruding portion is engaged is provided on the other of the first heat shielding plate and the second heat shielding plate.

4. The vehicle according to claim 3, wherein
each of the first heat shielding plate and the second heat shielding plate has an embossing region on which embossing is performed in a region other than the overlapping portion, and
the overlapping portion is formed with an embossment having an uneven height smaller than an uneven height of an embossment of the embossing region, or is not embossed.

\* \* \* \* \*